(12) United States Patent
Marchildon et al.

(10) Patent No.: US 9,604,682 B2
(45) Date of Patent: Mar. 28, 2017

(54) TRACK SYSTEM WITH ADJUSTABLE IDLER WHEELS AND METHOD OF USING THE SAME

(71) Applicant: Soucy International Inc., Drummondville (CA)

(72) Inventors: Louis-Frédéric Marchildon, Drummondville (CA); Martin Bellemare, Drummondville (CA)

(73) Assignee: SOUCY INTERNATIONAL INC., Drummondville (CA)

( * ) Notice: Subject to any disclaimer, the term of this patent is extended or adjusted under 35 U.S.C. 154(b) by 1029 days.

(21) Appl. No.: 13/724,743

(22) Filed: Dec. 21, 2012

(65) Prior Publication Data

US 2014/0175864 A1 Jun. 26, 2014

(51) Int. Cl.
| | | |
|---|---|---|
| *B62D 55/14* | (2006.01) | |
| *B62D 55/15* | (2006.01) | |
| *B62D 55/30* | (2006.01) | |
| B62D 55/084 | (2006.01) | |

(52) U.S. Cl.
CPC ............. *B62D 55/14* (2013.01); *B62D 55/15* (2013.01); *B62D 55/305* (2013.01); *B62D 55/084* (2013.01)

(58) Field of Classification Search
CPC ........ B62D 55/14; B62D 55/15; B62D 55/30; B62D 55/084; B62D 55/305
USPC ....... 305/130, 132, 133, 143, 150, 153, 154, 305/156
See application file for complete search history.

(56) References Cited

U.S. PATENT DOCUMENTS

| | | | | |
|---|---|---|---|---|
| 3,068,950 A | * | 12/1962 | Davidson | A61G 5/061 180/6.5 |
| 3,826,325 A | * | 7/1974 | Purcell | B62D 55/08 180/9.1 |
| 3,893,526 A | * | 7/1975 | Esch | B62D 55/07 180/193 |
| 4,840,437 A | * | 6/1989 | Henry | B62D 55/305 305/144 |
| 5,639,148 A | * | 6/1997 | Sheidler | B62D 55/084 305/116 |
| 7,520,348 B2 | * | 4/2009 | Bergsten | A01D 42/08 180/9.1 |
| 8,708,068 B2 | * | 4/2014 | Yada | B60B 19/12 180/7.1 |
| 9,033,430 B2 | * | 5/2015 | Zuchoski | 305/135 |

(Continued)

*Primary Examiner* — S. Joseph Morano
*Assistant Examiner* — Jean Charleston
(74) *Attorney, Agent, or Firm* — Brouillette Legal Inc.; Robert Brouillette

(57) ABSTRACT

A track system for use as a wheel replacement on typically wheeled vehicle is disclosed. The track system comprises a drive wheel configured to be mounted to the vehicle, a support frame, front and rear idler wheels respectively pivotally mounted at the front and at the rear of the support frame, road wheels pivotally mounted along the support frame between the front and read idler wheels, and an endless track mounted about the wheels. The position of the front and/or rear idler wheels is adjustable in order to modify the overall shape of the perimeter of the track system generally defined by the endless track, thereby changing the riding behavior of the track system. A method to change the position of the adjustable idler wheels is also disclosed.

17 Claims, 18 Drawing Sheets

(56) References Cited

U.S. PATENT DOCUMENTS

2005/0241841 A1\* 11/2005 Rosenboom ......... B62D 55/104
                                                    172/776
2012/0242142 A1\* 9/2012 Kautsch ................ B62D 55/02
                                                    305/142

\* cited by examiner

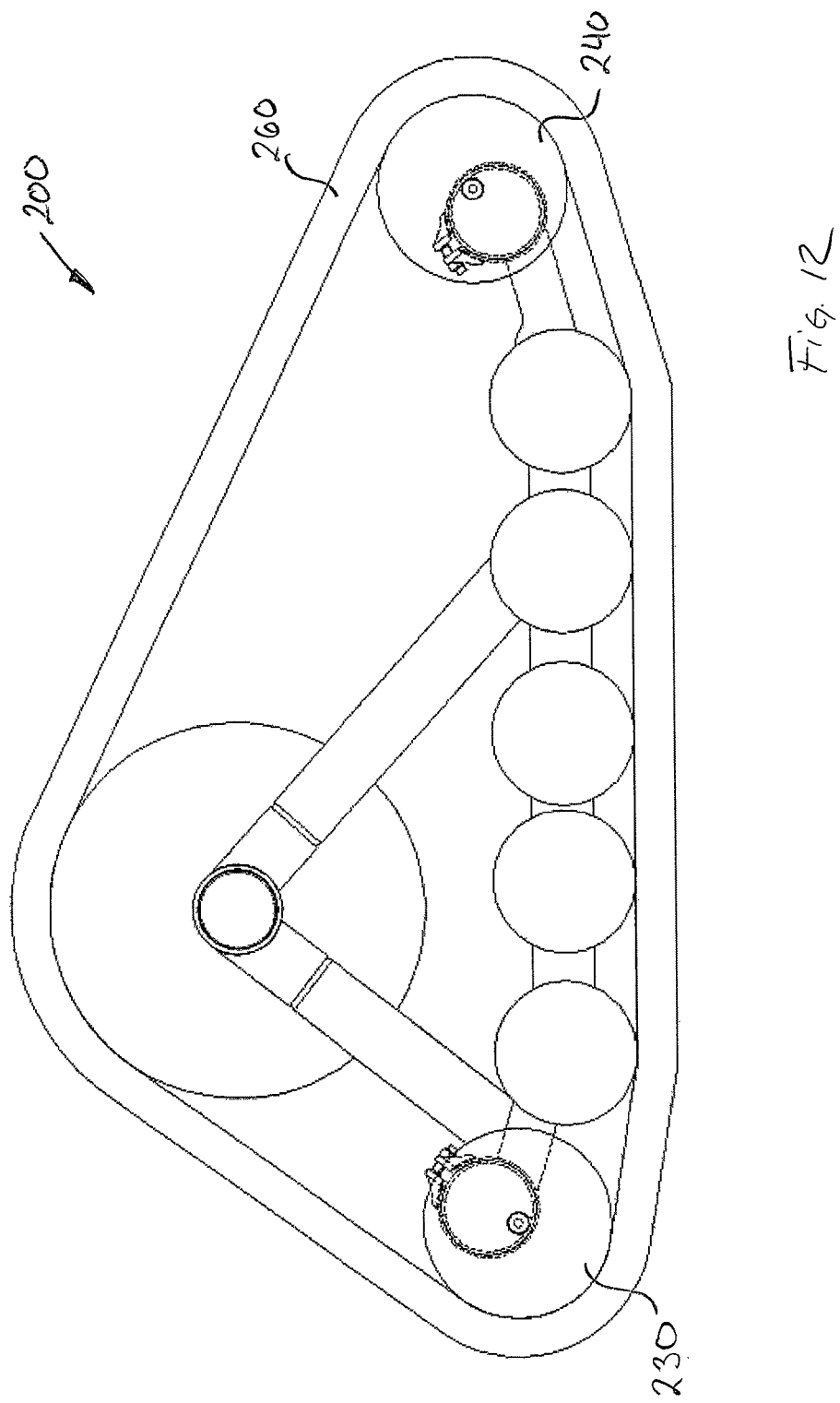

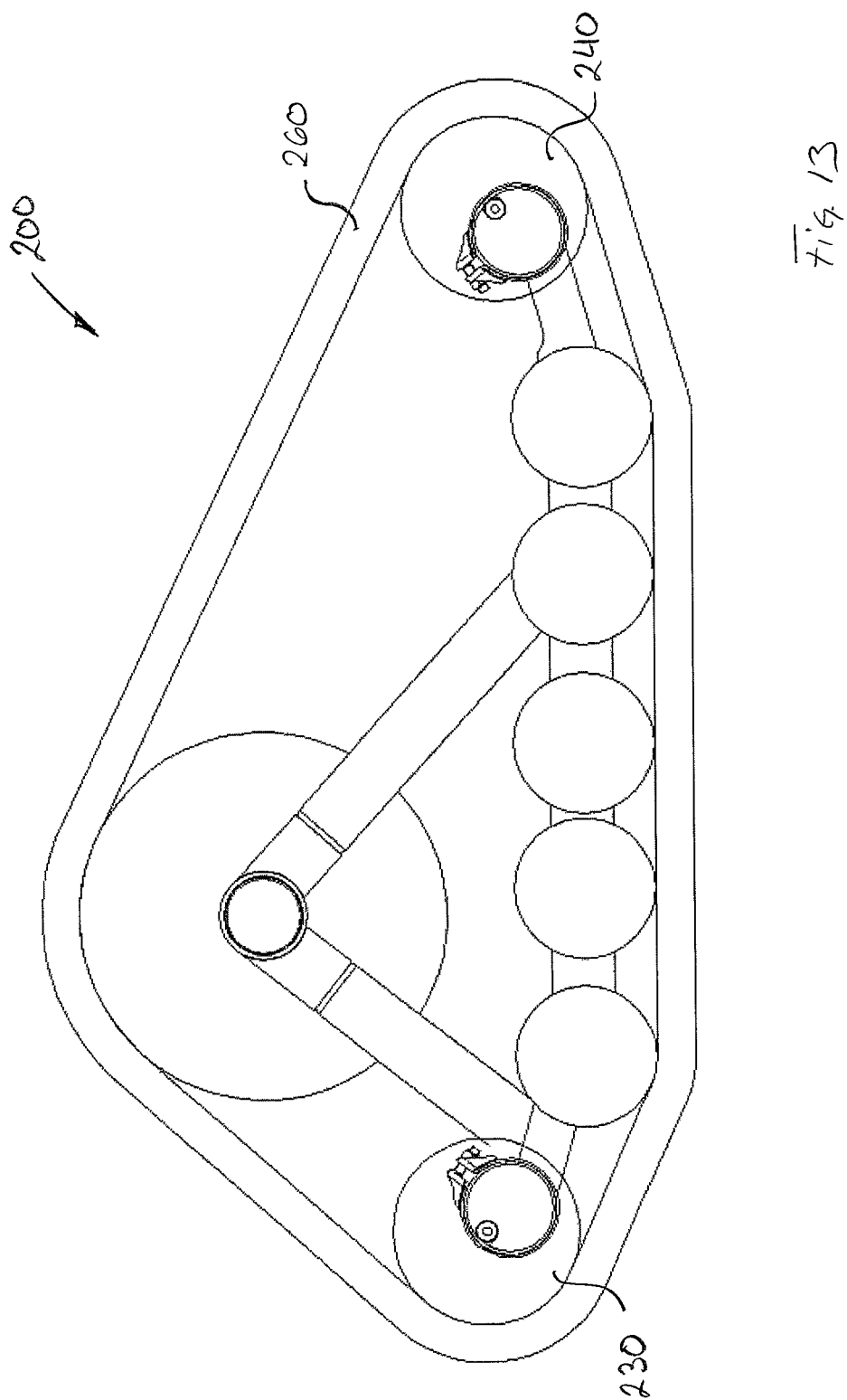

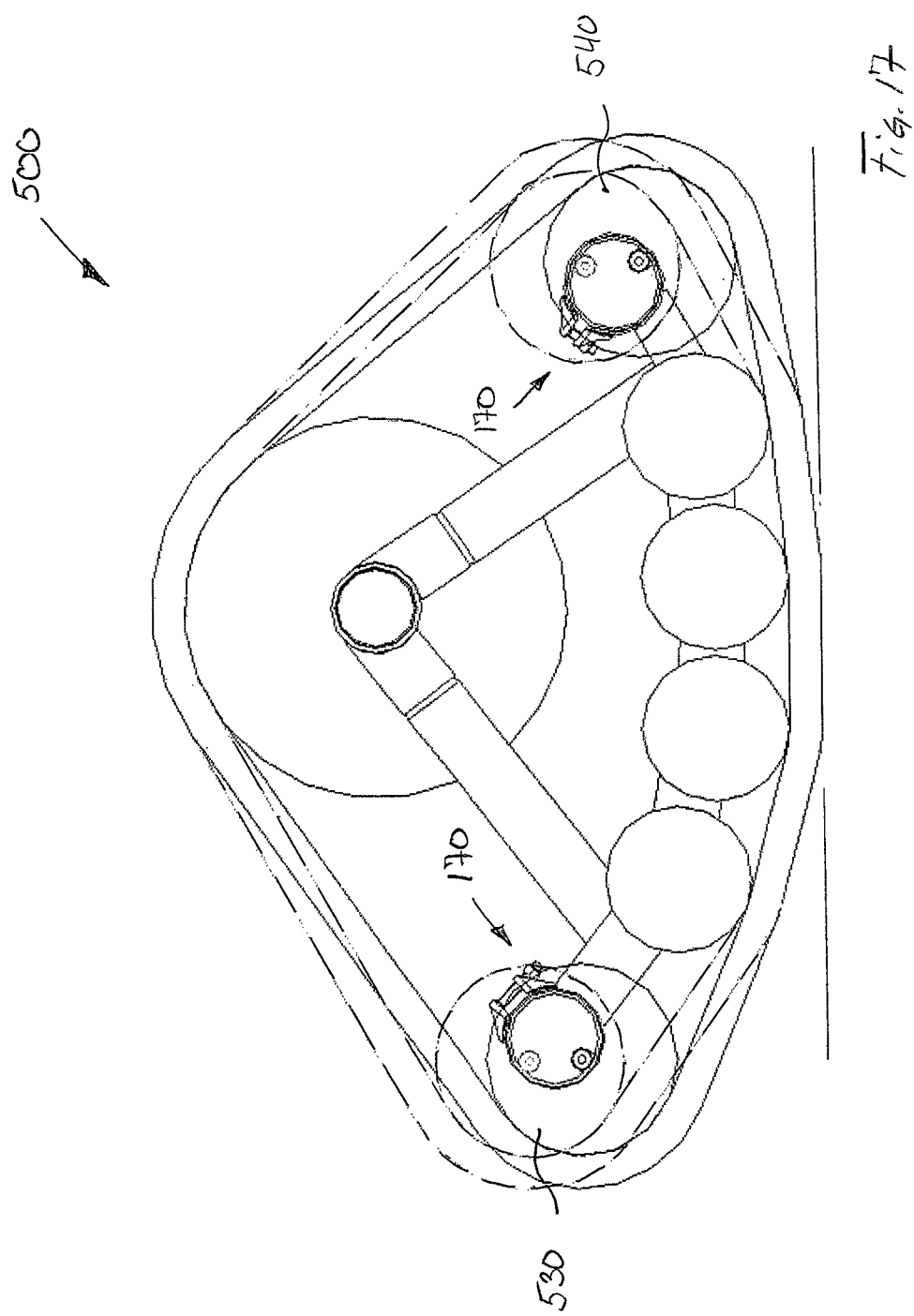

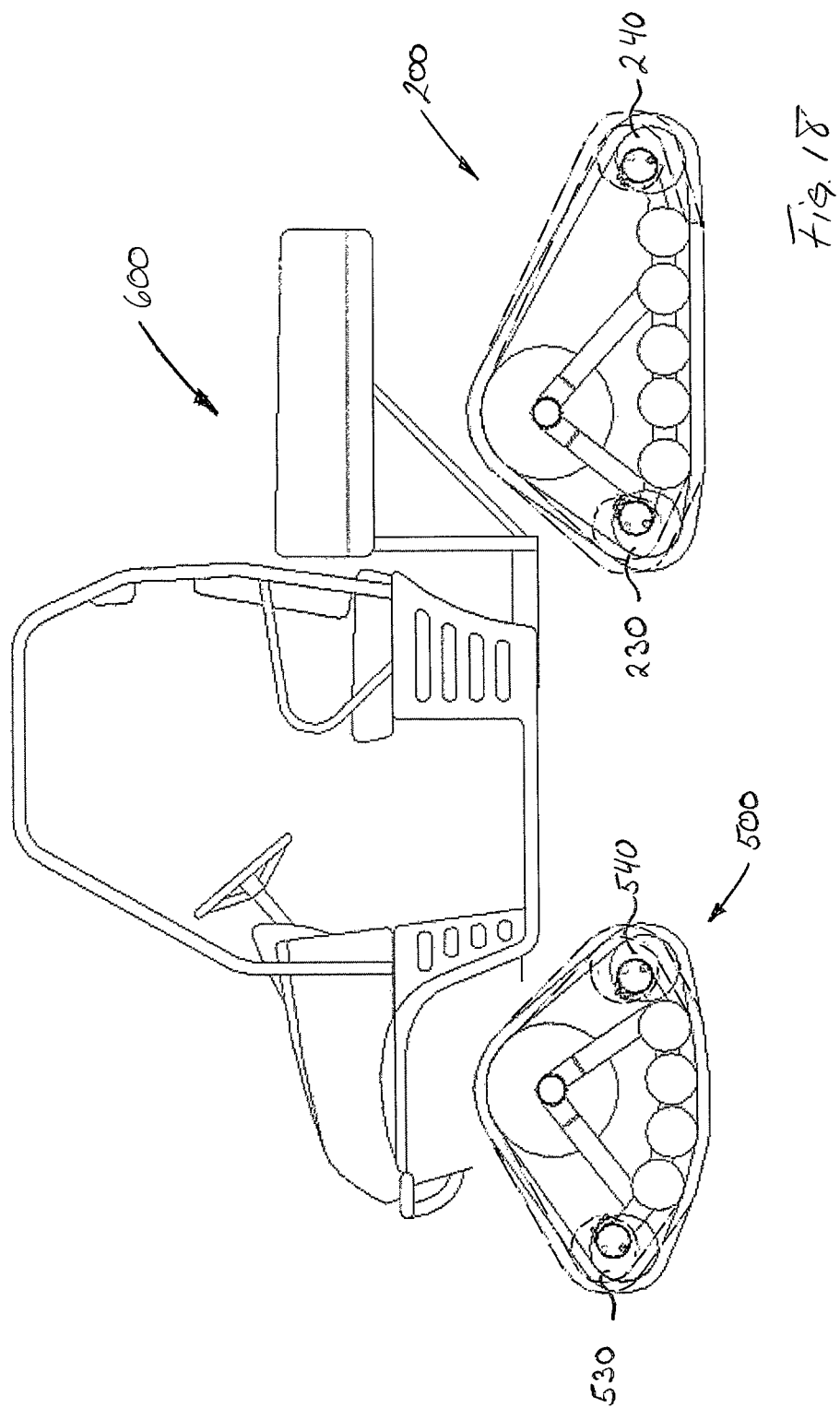

TRACK SYSTEM WITH ADJUSTABLE IDLER WHEELS AND METHOD OF USING THE SAME

CROSS-REFERENCE TO RELATED APPLICATIONS

There are no cross-related applications.

FIELD OF THE INVENTION

The present invention generally relates to track systems and traction assemblies for use as wheel replacement on typically wheeled vehicles, and more particularly relates to track systems and traction assemblies for use as wheel replacement on typically small vehicles such as, but not limited to, all-terrain vehicles (ATVs), utility-terrain vehicles (UTVs), and side-by-side vehicles (SSVs). The present invention also relates to track systems and traction assemblies for use as wheel replacement on large wheeled vehicles such as, but not limited to, industrial vehicles, construction vehicles, agricultural vehicles, and forestry vehicles.

BACKGROUND OF THE INVENTION

Several normally wheeled vehicles and particularly small wheeled vehicles (e.g. ATVs, UTVs, SSVs, etc.) often have their wheels replaced by track systems which use endless traction bands instead of tires for propulsion. Vehicles equipped with such track systems typically have improved floatation and better traction, particularly when they are operated over uneven and/or soft terrains.

However, track systems are often designed for particular operating conditions. For instance, some track systems are more particularly designed for operating over rough and irregular terrains. Such track systems are thus typically configured to be able to overcome obstacles such as fallen tree trunks, rocks, roots, etc.

Other track systems are more particularly designed for operating over soft terrains such as snowy, muddy or sandy terrains. Such track systems are therefore typically configured to increase floatation over such terrains.

Still other track systems are designed for average performances over both rough terrains and soft terrains.

However, unless a vehicle operator is satisfied with average performances, he typically needs at least two sets of track systems if he wishes to operate his vehicle over both rough and soft terrains. Understandably, having two sets of track systems is not only expensive, it is time consuming when the track systems need to be changed on the vehicle.

Hence, there is a need for an improved track system which mitigates at least some shortcomings of prior art track systems.

SUMMARY OF THE INVENTION

A track system in accordance with the principles of the present invention generally mitigates some of the shortcomings of prior track systems by having the front idler wheels and/or the rear idler wheels selectively adjustable such as to change the overall shape of the perimeter of the track system, defined by the endless track, in order to change the operating behavior of the track system.

Hence, a track system in accordance with the principles of the present invention generally comprises a drive wheel configured to be mounted to the vehicle, a support frame (or support frame assembly), front and rear idler wheels typically respectively pivotally mounted at the front and at the rear of the support frame, road (or support) wheels pivotally mounted along the support frame longitudinally between the idler wheels, and an endless track disposed about the drive wheel, the idler wheels and the road wheels.

The front idler wheels and/or the rear idler wheels are pivotally mounted to the support frame via an adjustable position adjustment mechanism mounted to the support frame. The adjustment mechanism allows the idler wheels to be in at least two different operating positions.

By changing the operating position of the idler wheels, the overall shape of the perimeter of the track system, generally defined by the endless track, can be changed, thereby changing the riding behavior of the track system.

In typical though non-limitative embodiments of a track system in accordance with the principles of the present invention, the adjustment mechanism allows at least a high operating position and a low operating position. When the front idler wheels are adjustable, the high operating position will raise the front portion of the overall shape of the perimeter of the track system, allowing it to generally more easily overcome obstacles present on rough terrains. For its part, the low operating position of the front idler wheels will lower the front portion of the overall shape of the perimeter of the track system, thereby increasing the floatation of the track system by generally increasing the size of its contact patch. When the rear idler wheels are adjustable, the high operating position will raise the rear portion of the overall shape of the perimeter of the track system, allowing it to generally more easily overcome obstacles present on rough terrains when the track system is operated in reverse. For its part, the low operating position of the rear idler wheels will lower the rear portion of the overall shape of the perimeter of the track system, thereby increasing the floatation of the track system by generally increasing the size of its contact patch.

Understandably, depending on the exact configurations of the track system and of the vehicle to which it is mounted, the different operating positions of the front and/or rear idler wheels may provide other and/or additional benefits.

When both the front and rear idler wheels are adjustable, the front and rear idler wheels can be independently adjusted to obtain particular riding performances. For instance, the front idler wheels could be in high operating position to allow the track system to more easily overcome obstacles, while the rear idler wheels could be in low operating position to improve floatation. Such adjustments could provide good overall performance over rough and soft terrains.

Similarly, when both the front and rear idler wheels are adjustable on both the front and rear track systems, the idler wheels can be adjusted differently on the front track system and on the rear track system to better suit the configurations of the front and rear track systems.

Understandably, by being able to selectively change the overall shape of the perimeter of the track system between different operating configurations, the track system in accordance with the principles of the present invention can be properly adjusted to be used in different operating conditions.

Other and further aspects and advantages of the present invention will be obvious upon an understanding of the illustrative embodiments about to be described or will be indicated in the appended claims, and various advantages not referred to herein will occur to one skilled in the art upon employment of the invention in practice. The features of the present invention which are believed to be novel are set forth with particularity in the appended claims.

BRIEF DESCRIPTION OF THE DRAWINGS

The above and other aspects, features and advantages of the invention will become more readily apparent from the following description, reference being made to the accompanying drawings in which:

FIG. 12 is a schematic side view of the overall shape of the perimeter of the endless track of a rear track system when the front idler wheels are in the first operating position and when the rear idler wheels are in the second operating position.

FIG. 13 is a schematic side view of the overall shape of the perimeter of the endless track of a rear track system when the front idler wheels are in the second operating position and when the rear idler wheels are in the second operating position.

FIG. 17 is a schematic side view of the overall shape of the perimeters of the endless track of a front track system when the front idler wheels are in the first operating position and in the second operating position (in dashed lines), and when the rear idler wheels are in the first operating position and in the second operating position (in dashed lines).

FIG. 18 is a schematic side view of the overall shape of the perimeters of the endless tracks of the front track system shown in FIG. 17 and of the rear track system shown in FIG. 9, when the front and rear track systems are mounted to a vehicle.

DETAILED DESCRIPTION OF THE PREFERRED EMBODIMENT

A novel track system with adjustable idler wheels, and a method of using the same, will be described hereinafter. Although the invention is described in terms of specific illustrative embodiments, it is to be understood that the embodiments described herein are by way of example only and that the scope of the invention is not intended to be limited thereby.

Figure 1:
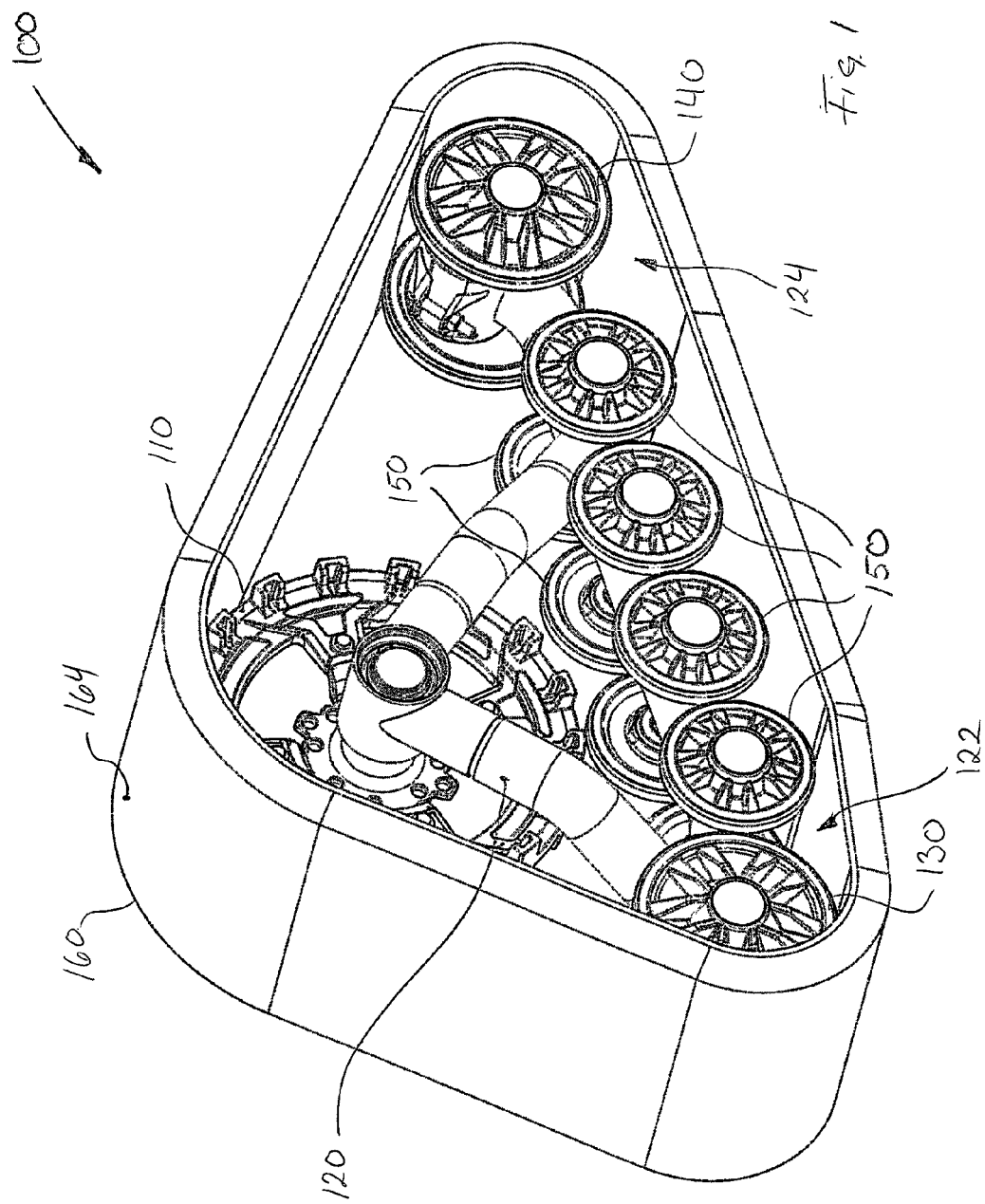
FIG. 1 is a perspective view of an embodiment of a track system in accordance with the principles of the present invention, with the rear idler wheels in a first operating position.
Figure 5:
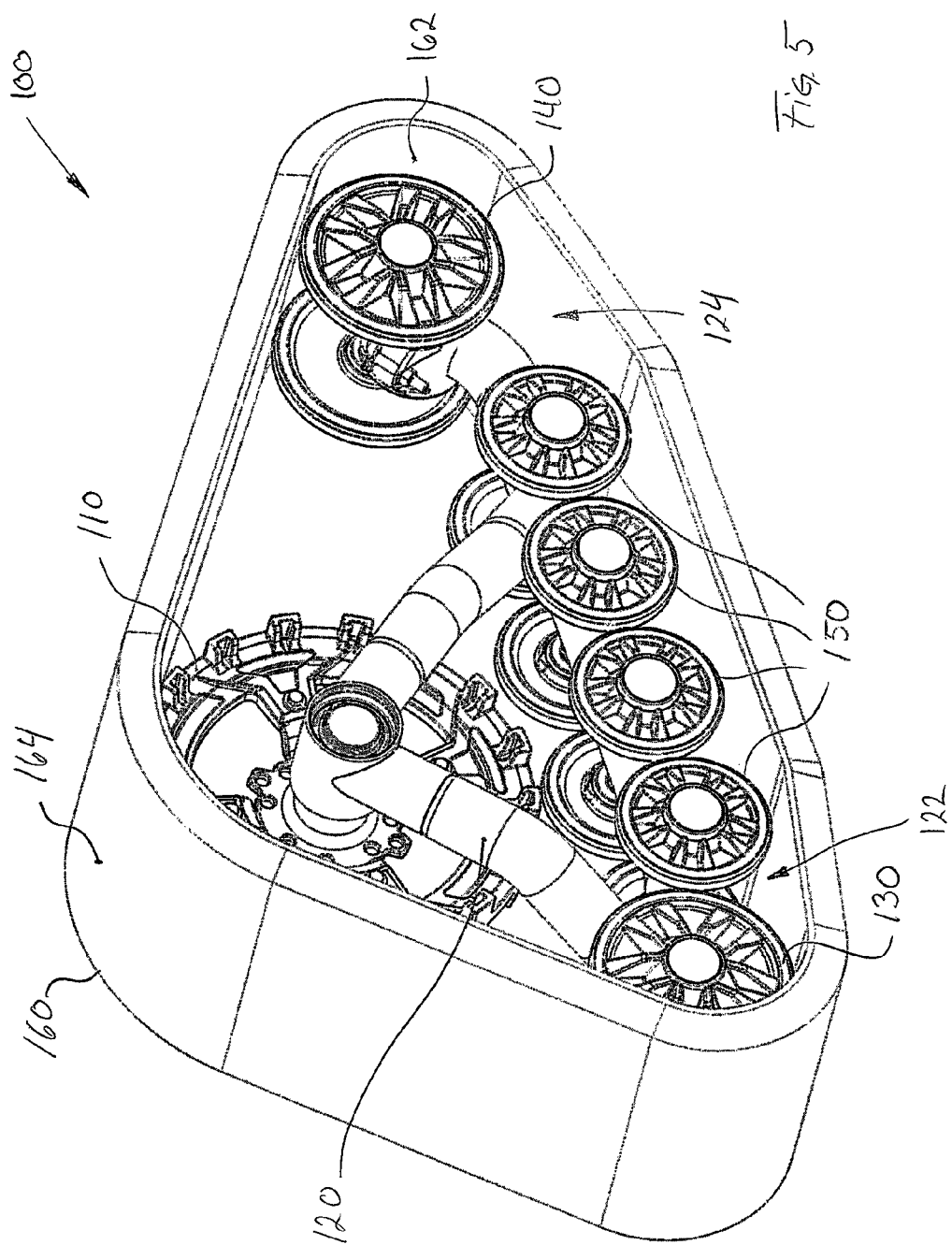
FIG. 5 is perspective view of the track system of FIG. 1, with the rear idler wheels in a second operating position.

Referring first to FIGS. 1 and 5, an embodiment of a track system 100 in accordance with the principles of the present invention is shown. The track system 100 is configured to replace a wheel on a typically wheeled vehicle in order to generally improve the floatation and/or traction thereof. In the present embodiment, the track system 100 is configured to replace rear wheel on a typically small wheeled vehicle such as an ATV, a UTV, a SSV or any other similar recreational vehicle (see UTV 600 in FIG. 18).

The track system 100 comprises a drive wheel 110 configured to be mounted to the vehicle, typically to a wheel hub thereof, a support frame 120, front idler wheels 130 and rear idler wheels 140 respectively pivotally mounted to the support frame 120 at the forward end 122 and at the rearward end 124 thereof, road (or support) wheels 150 pivotally mounted to the support frame 120 along its length, typically on both sides, and an endless track 160 disposed about the drive wheel 110, the idler wheels 130 and 140 and the road wheels 150, and configured to be drivingly engaged by the drive wheel 110.

In the present embodiment, the drive wheel 110 is a sprocket wheel and drivingly engages the track 160 via drive lugs (not shown) disposed along the circumference of the inner surface 162 of the track 160. The inner surface 162 can also comprises guide lugs (not shown) disposed along its circumference. For its part, the outer surface 164 of the track 160 comprises a plurality of traction lugs (not shown) configured to engage the ground surface over which the track system 100 is operated.

The track 160 is typically made of elastomeric material (e.g. rubber) and typically comprises longitudinal reinforcements (e.g. cables, cords, wire ropes) and lateral reinforcements (e.g. lateral rods, stiffeners).

In the present embodiment, the support frame 120 is pivotally mounted to the drive wheel 110 albeit it is not drivingly engaged by the drive wheel 110. In other embodiments, the support frame 120 could be mounted directly to the vehicle.

As it will best be understood below, the rear idler wheels 140 are mounted to the support frame 120 such that they can be in at least two different operating positions. By allowing the rear idler wheels 140 to be in at least two different operating positions, the overall shape of the perimeter of the track system 100, generally defined by the endless track 160 disposed about the wheels, can be changed to better suit the terrain over which the track system 100 is operated.

In that sense, referring now to FIGS. 2, 4, 6 and 8, in the present embodiment, the support frame 120 comprises a position adjustment mechanism 170. The adjustment mechanism 170 pivotally supports the rear idler wheels 140 and allows the rear idler wheels 140 to be in at least two different operating positions.

Figure 4:
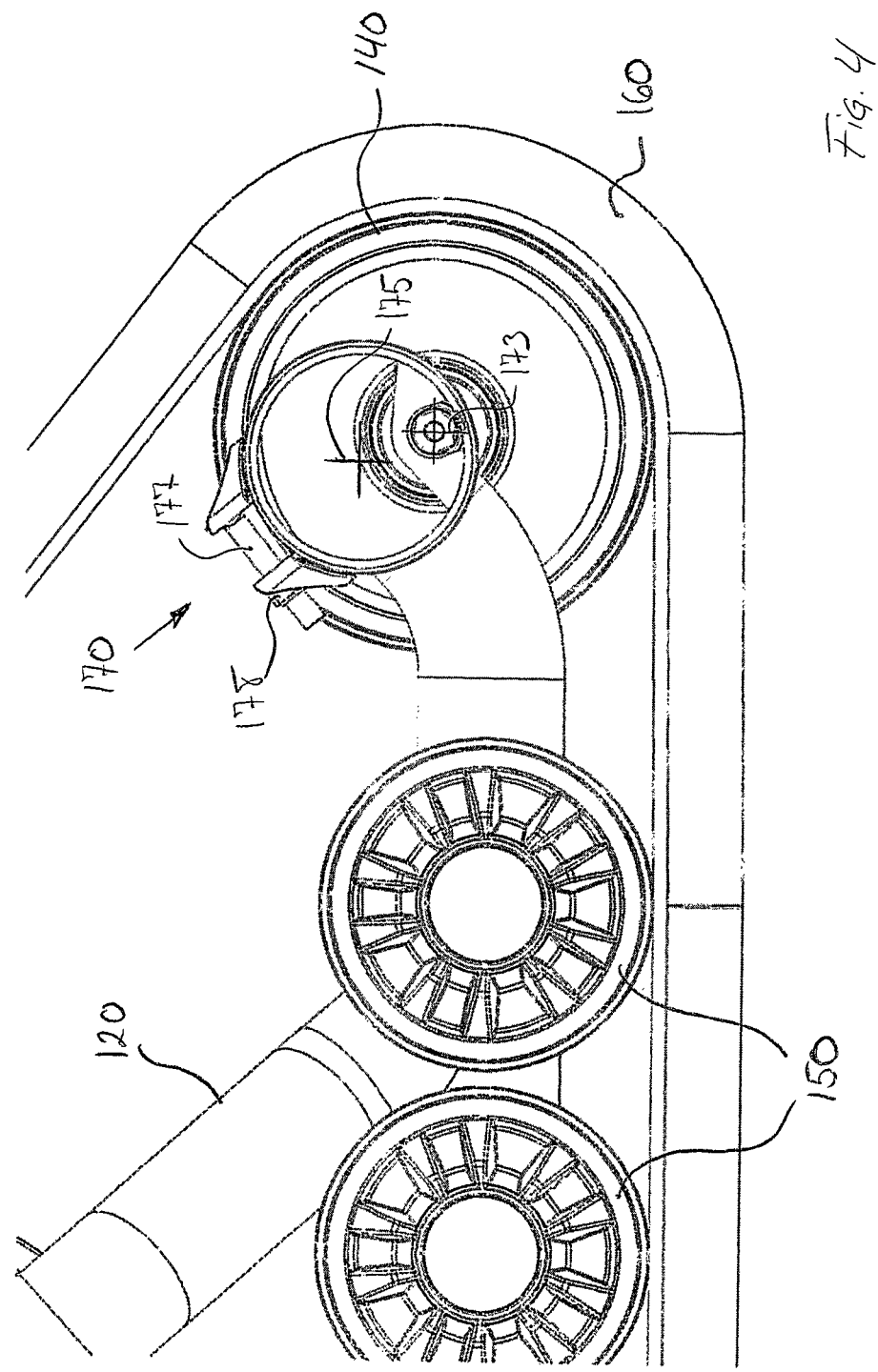
FIG. 4 is an enlarged side view of the rear idler wheel area of the track system of FIG. 1, with one rear idler wheel removed.
Figure 8:
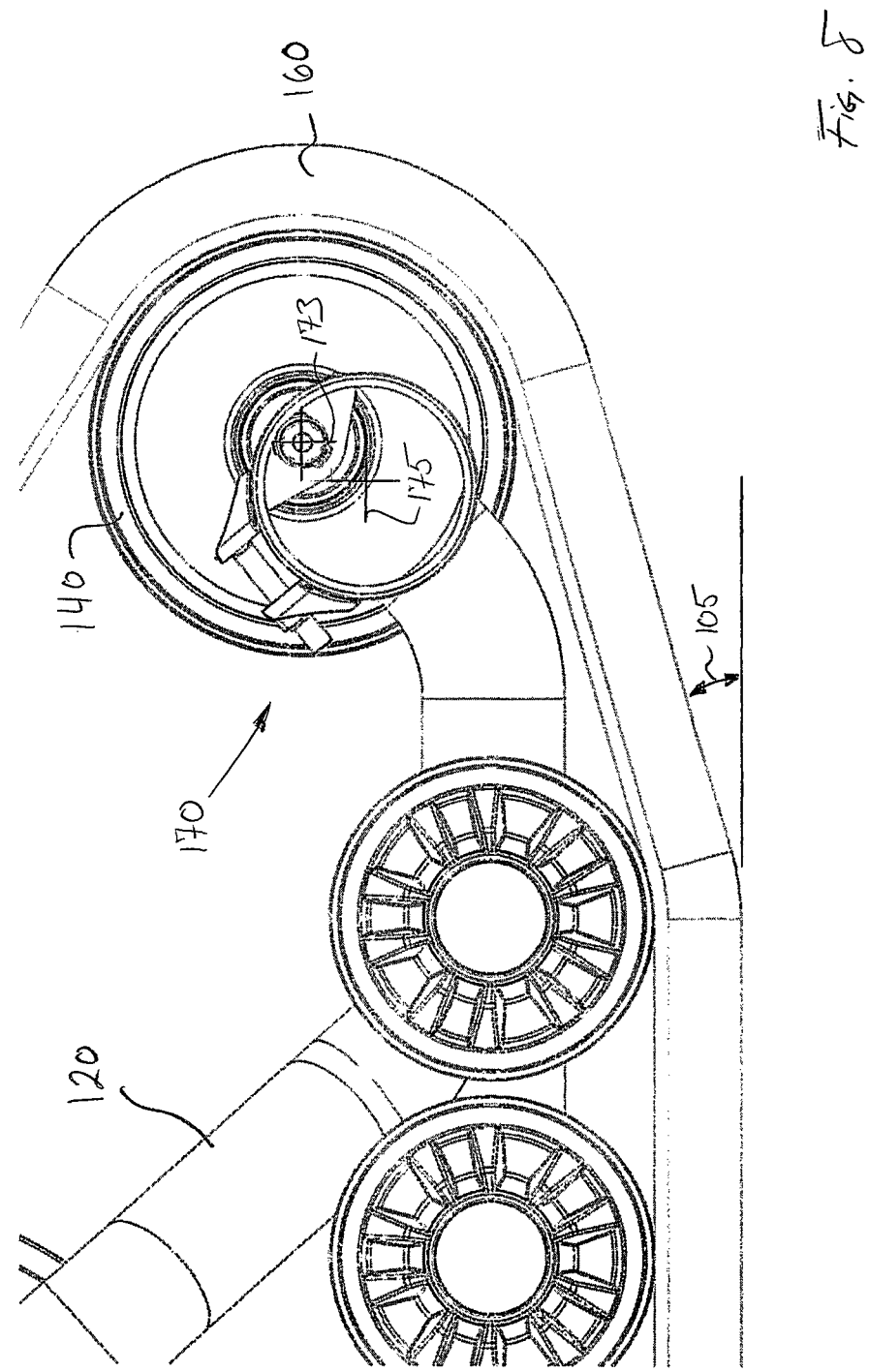
FIG. 8 is an enlarged side view of the rear idler wheel area of the track system of FIG. 5, with one rear idler wheel removed.

The mechanism 170 generally comprises a clamping member (e.g. clamping ring) 172 integrated to the support frame 120, and a rotatable support member 174 received into the clamping member 172. The support member 174 pivotally supports the rear idler wheels 140 on a laterally extending shaft 176. The shaft 176 defines an axis 173 which is not coaxial with the central axis 175 of the support member 174. Hence, when the support member 174 is rotated within the clamping member 172, the rear idler wheels 140 can be in at least two operating positions as best shown in FIGS. 4 and 8. Understandably, in the present embodiment, since the support member 174 can be rotated within the clamping member 172, the rear idler wheels 140 could possibly be in an infinity of operating position if the endless track 160 is otherwise properly tensioned. Other embodiments of the adjustment mechanisms might however be limited to two operating positions (see FIGS. 16A and 16B).

To properly hold the support member 174 within the clamping member 172, the latter comprises bolt 177 and nut 178 for closing the clamping member 172 around the support member 174 and holding it by friction. The bolt 177 and nut 178 can also loosen the clamping member 172 to allow the support member 174 to rotate within it during adjustment.

Figure 2:
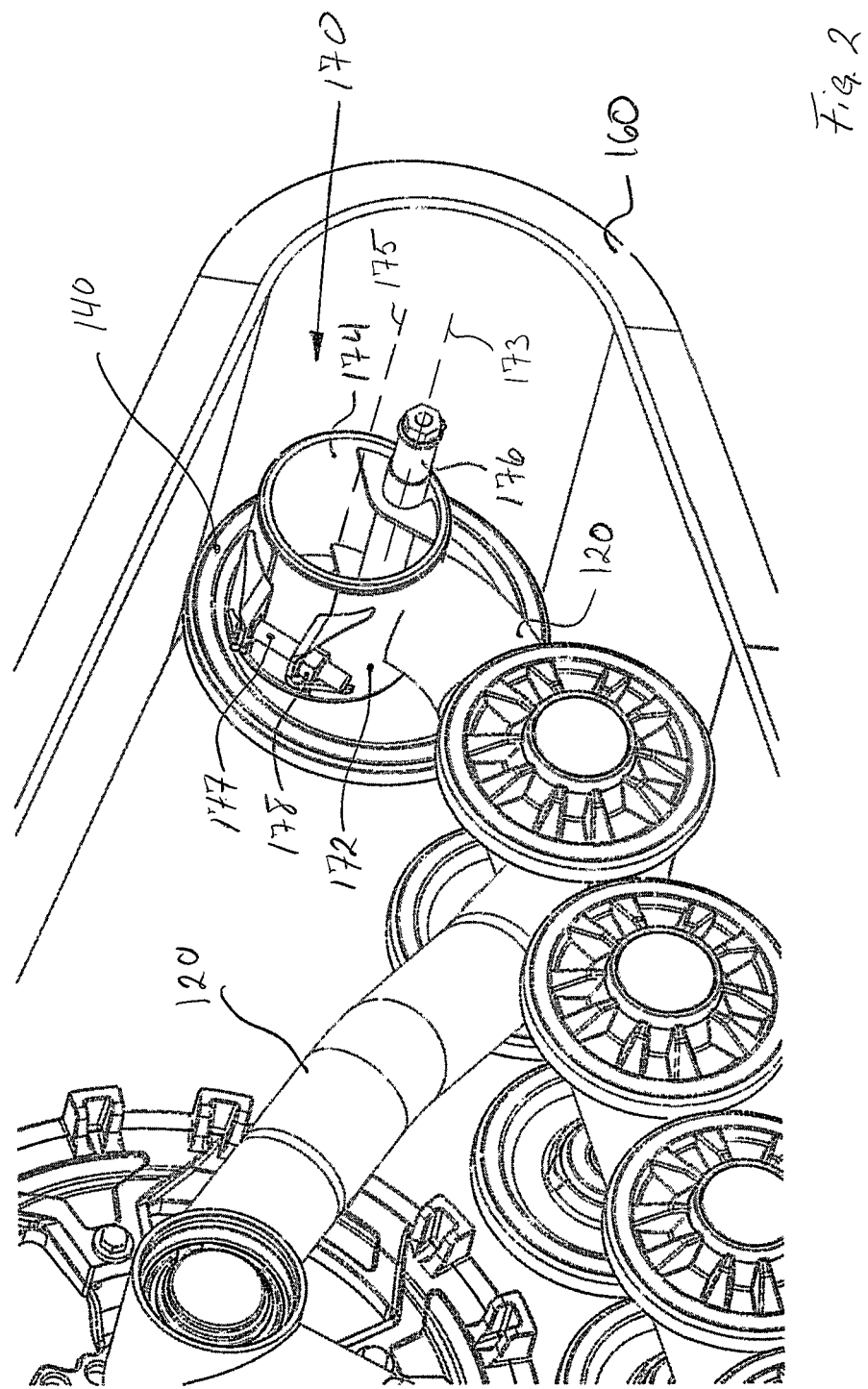
FIG. 2 is an enlarged perspective view of the rear idler wheel area of the track system of FIG. 1, with one rear idler wheel removed.
Figure 3:
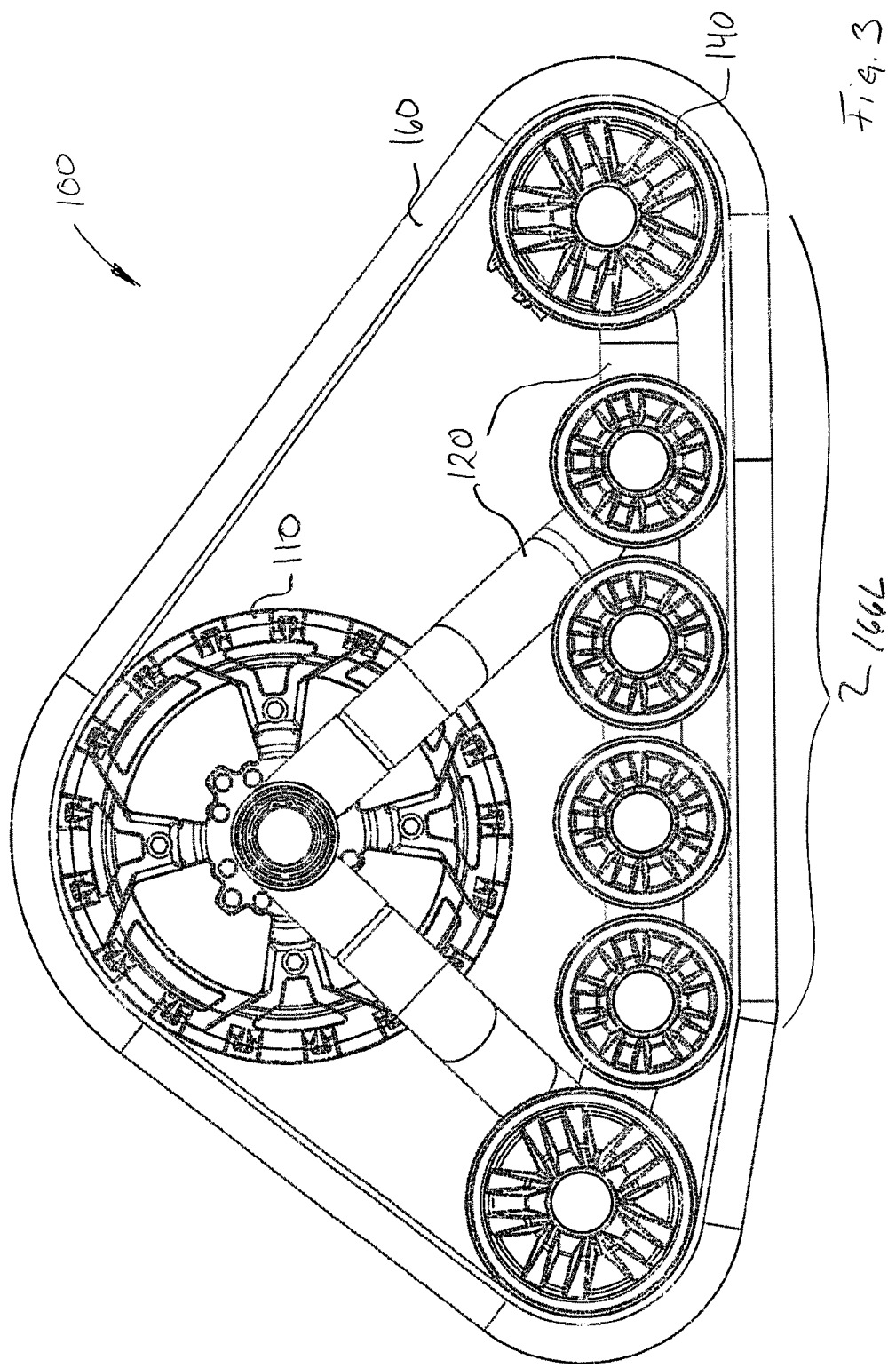
FIG. 3 is a side view of the track system of FIG. 1.

Referring now to FIGS. 2-4, the support member 174 is depicted in a first operating position which, in the present embodiment, is a low operating position. As best shown in FIGS. 3 and 4, in such a position, the rear portion of the overall shape of the perimeter of the track system 100 is lowered, i.e. the rear idler wheels 140 are closer to the ground surface. Understandably, when the support member 174 and thus the idler wheels 140 are in such a low operating position, the track system 100 is particularly well suited for operation over soft terrains such as snowy, muddy or sandy terrain since the floatation of the track system 100 is increased. Indeed, as best shown in FIG. 3, by lowering the rear portion of the overall shape of the perimeter, the size of the contact patch 166L of the track system 100 is increased, thereby spreading the weight of the vehicle over a larger area.

Figure 6:
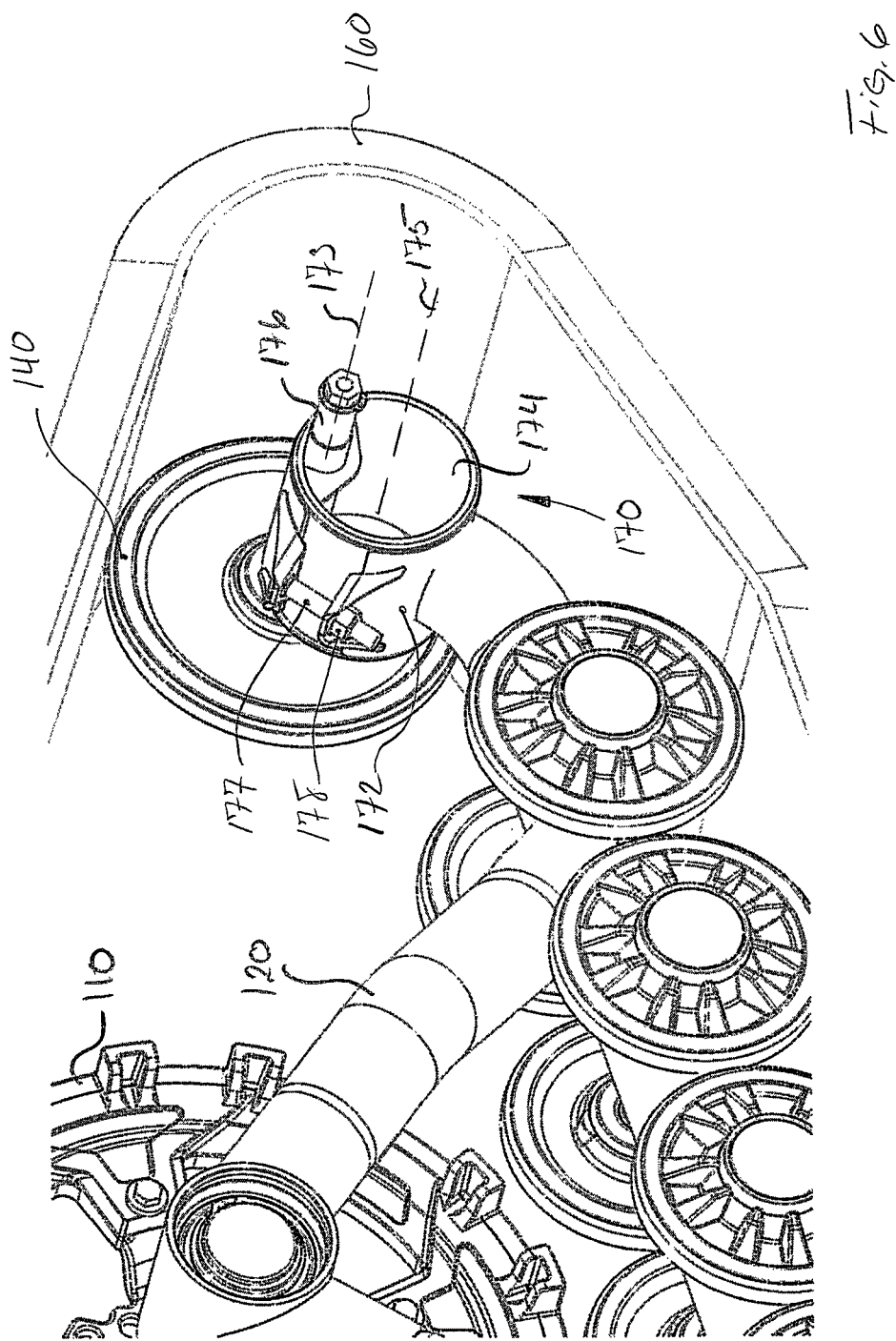
FIG. 6 is an enlarged perspective view of the rear idler wheel area of the track system of FIG. 5, with one rear idler wheel removed.
Figure 7:
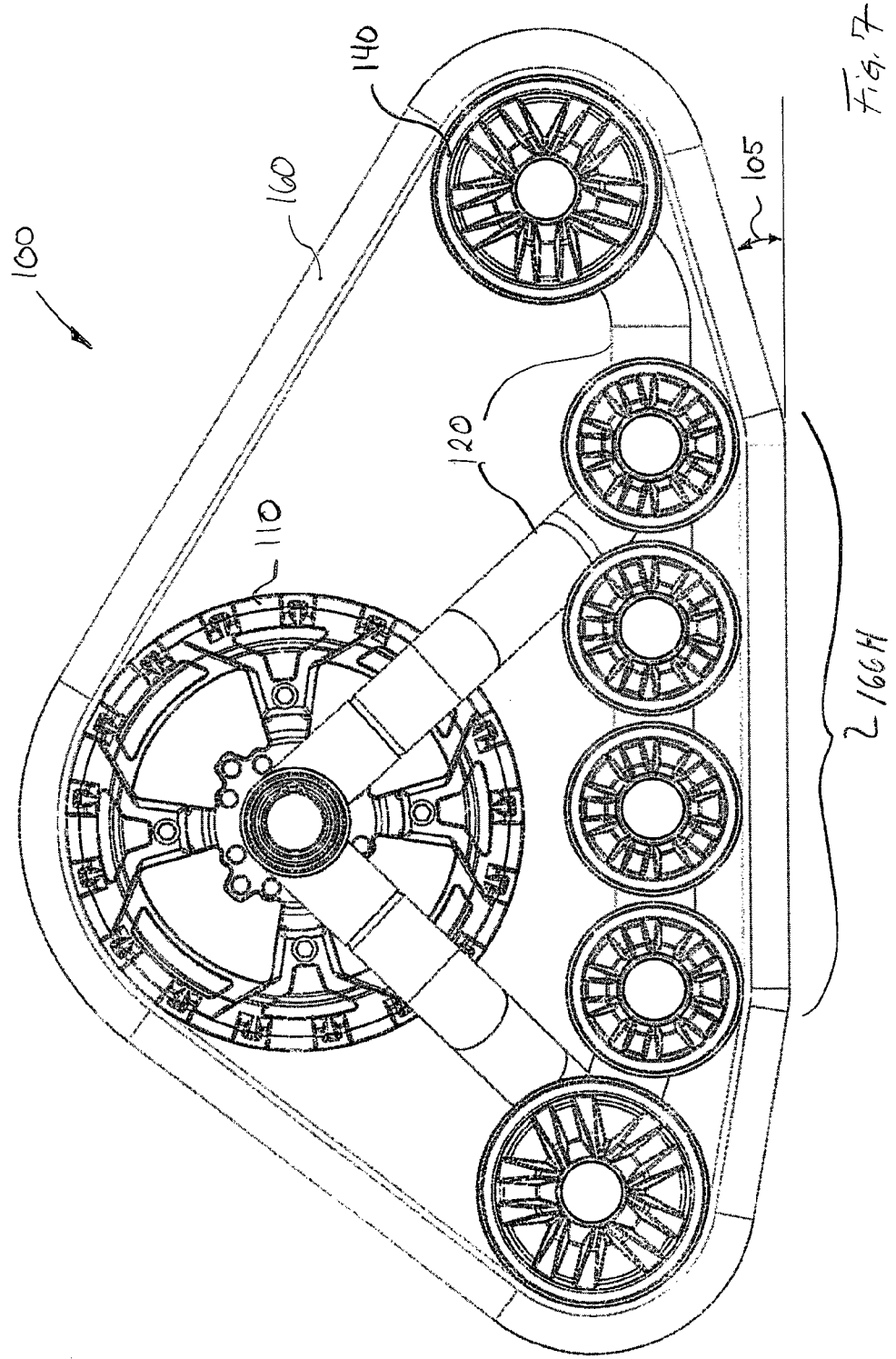
FIG. 7 is a side view of the track system of FIG. 5.

Now, in FIGS. 6-8, the support member 174 is depicted in a second operating position which, in the present embodiment, is a high operating position. As best shown in FIGS. 7 and 8, in such a position, the rear portion of the overall shape of the perimeter of the track system 100 is raised, i.e. the rear idler wheels 140 are farther from the ground surface, thereby raising the attack angle 105 of the track system 100. Understandably, when the support member 174 and thus the idler wheels 140 are in such a high operating position, the track system 100 is particularly well suited for operation over rough terrains since the attack angle 105 is greater and the traction of the track system 100 is increased. Indeed, having a larger attack angle 105 allows the track system 100 to more easily overcome obstacles such as fallen tree trunks, rocks, and roots. In addition, as best shown in FIG. 7, by raising the rear portion of the overall shape of the perimeter, the size of the contact patch 166H is decreased, thereby spreading the weight of the vehicle over a smaller area and increasing the traction of the track system 100.

Figure 9:
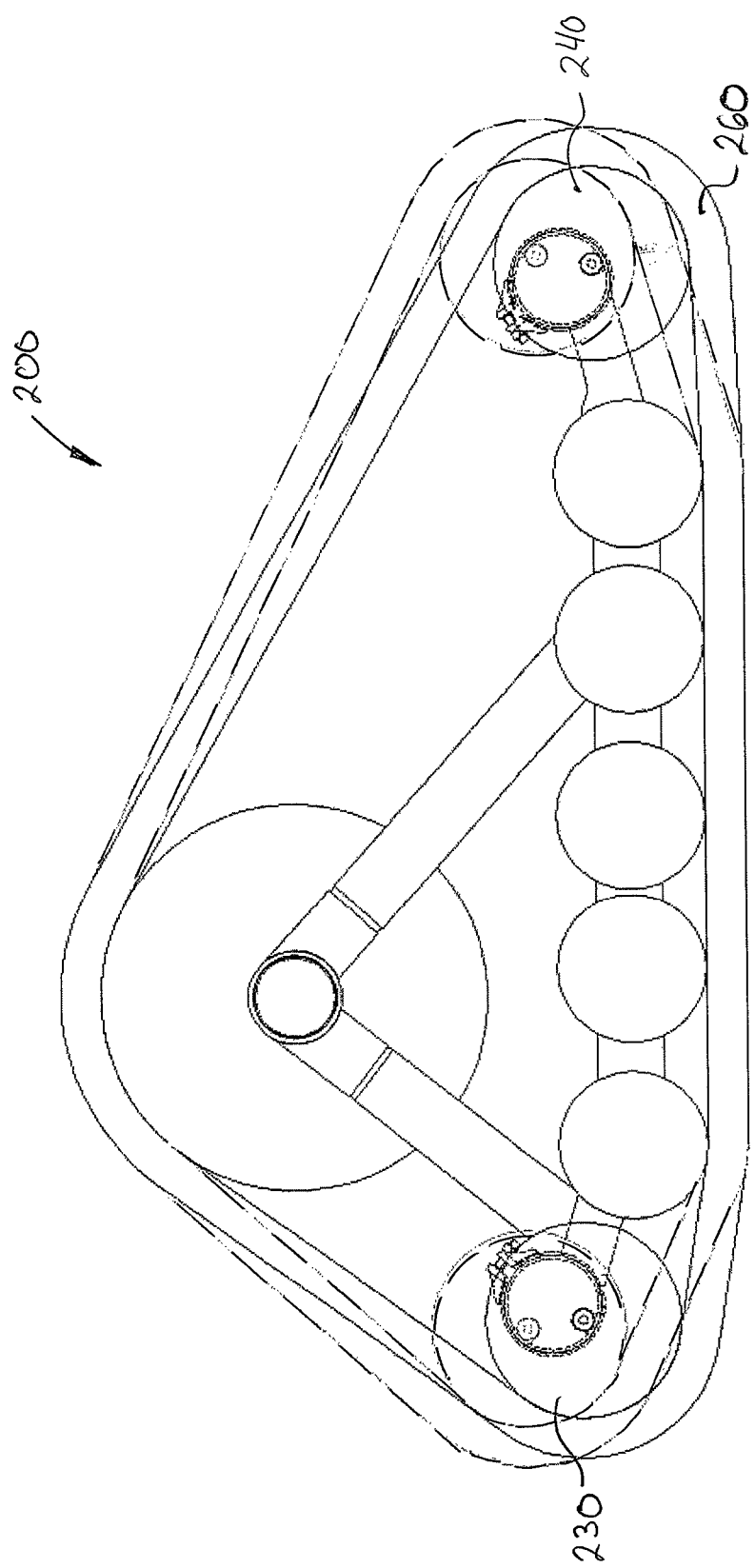
FIG. 9 is a schematic side view of the overall shape of the perimeters of the endless track of a rear track system when the front idler wheels are in the first operating position and in the second operating position (in dashed lines), and when the rear idler wheels are in the first operating position and in the second operating position (in dashed lines).
Figure 10:
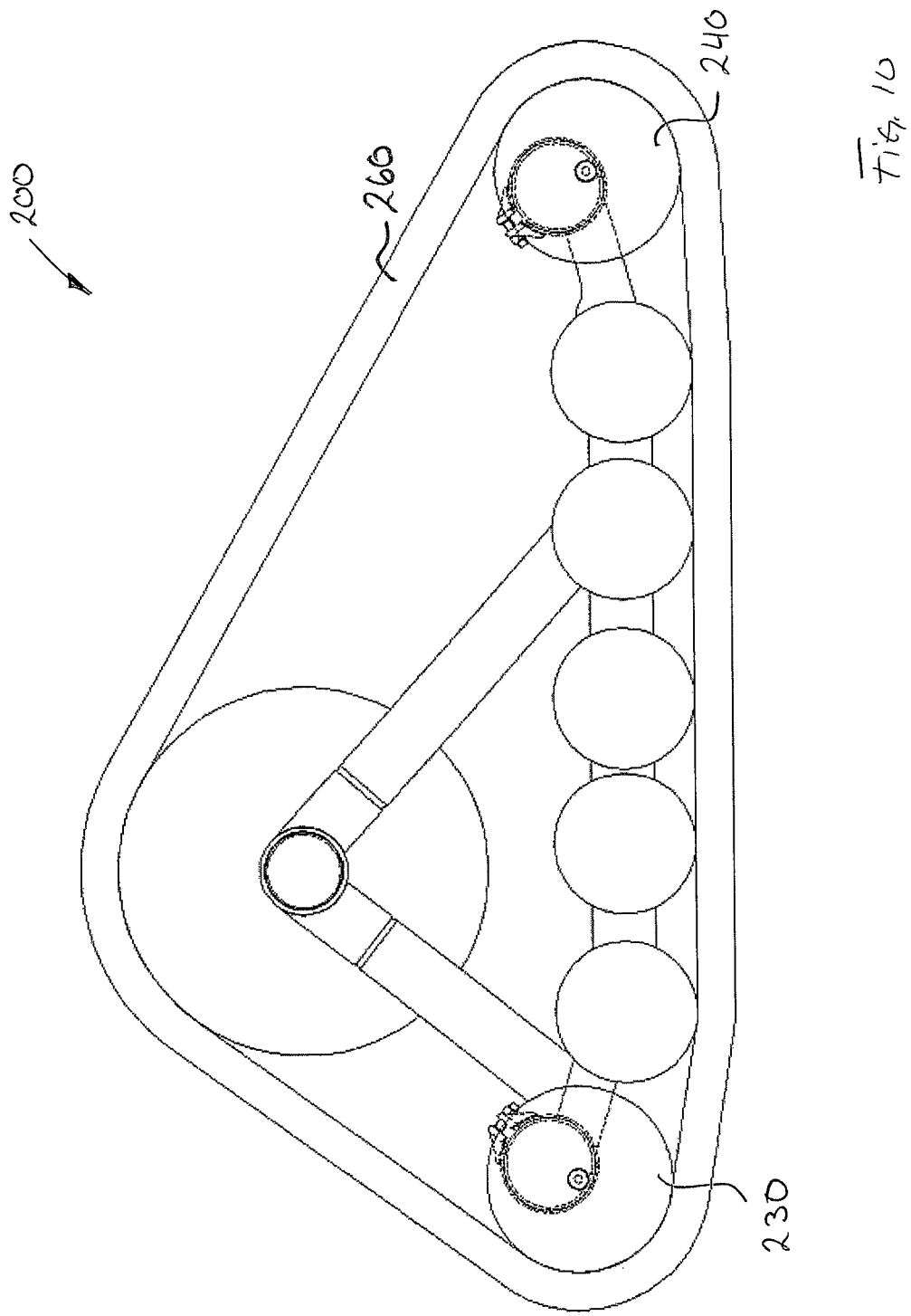
FIG. 10 is a schematic side view of the overall shape of the perimeter of the endless track of a rear track system when the front idler wheels are in the first operating position and when the rear idler wheels are in the first operating position.

Understandably, the same principles would apply to an adjustment mechanism 170 supporting the front idler wheel 130. In that sense, referring to FIG. 9, an overlaid comparison between the overall shape of the perimeters of a track system 200, generally defined by the endless track 260, when the adjustment mechanism 170 is in low operating position (solid lines) and when the adjustment mechanism 170 is in high operating position (dashed lines) is shown. The overlaid comparison clearly shows the change in the angle of attack and in the size of the contact patch when the position of both the front idler wheels 230 and the rear idler wheels 240 are changed.

Figure 11:
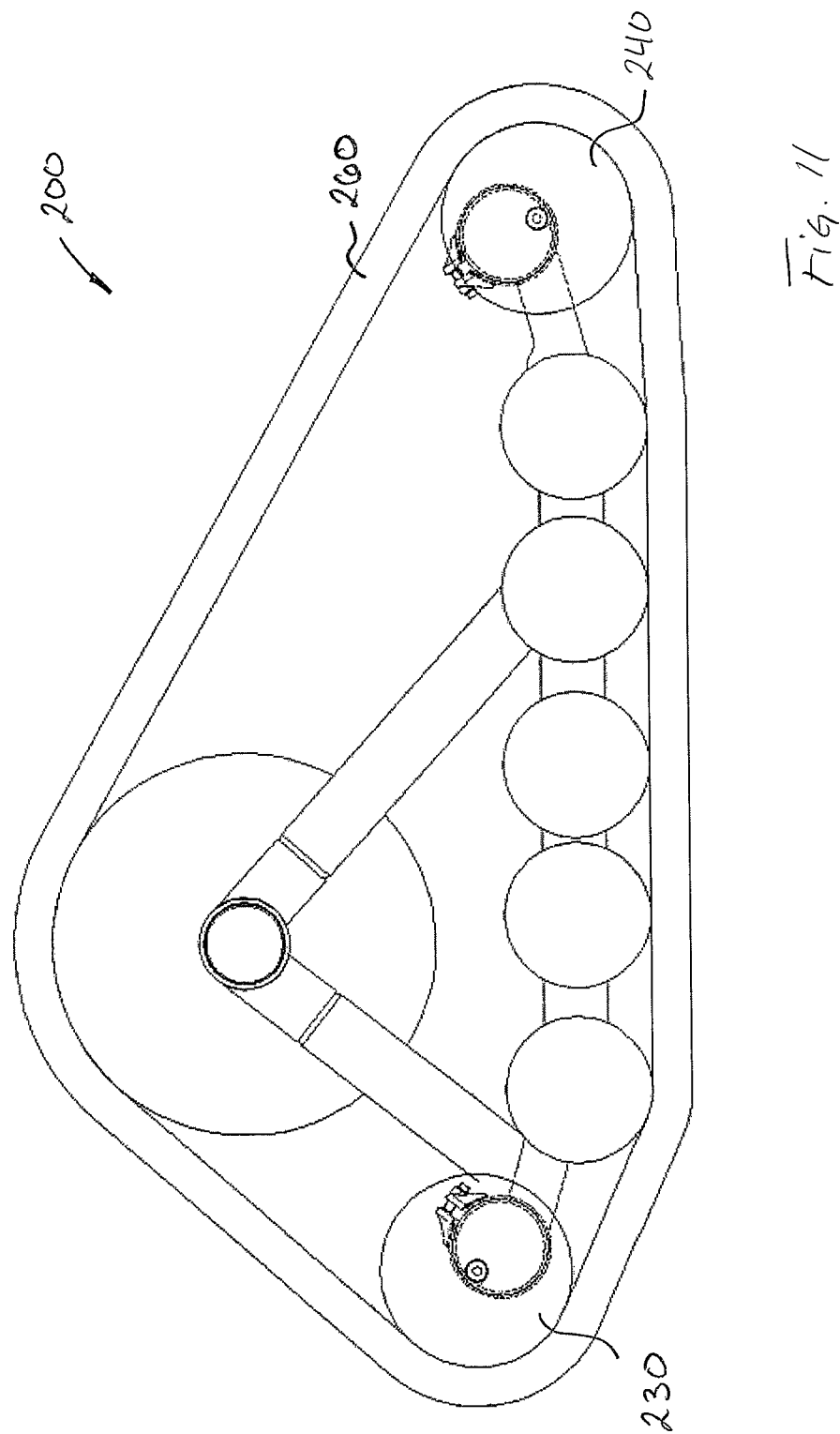
FIG. 11 is a schematic side view of the overall shape of the perimeter of the endless track of a rear track system when the front idler wheels are in the second operating position and when the rear idler wheels are in the first operating position.

FIGS. 10 to 13 also show that by simply changing the operating position of the front idler wheels 230, of the rear idler wheel 240, of the both idler wheels, the overall shape of the perimeter of the track system 200 can be changed such as to adapt the track system 200 to different operating conditions. For instance, in FIG. 10, both the front idler wheels 230 and the rear idler wheels 240 are in low operating position. Such configuration could be advantageous over soft terrains since the contact patch is larger. In FIG. 11, the front idler wheels 230 are in high operating position while the rear idler wheels 240 are in low operating position. Such configuration provides an improved angle of attack while keeping a relatively large contact patch. In FIG. 12, the situation is reversed and the front idler wheels 230 are in low operating position while the rear idler wheels 240 are in high operating position. Such configuration provides an improved angle of attack when the track system 200 is operated in reverse while keeping a relatively large contact patch. Such a configuration can also reduce the turning radius of the vehicle by reducing the friction generated by the track system 200. Finally, in FIG. 13, both the front idler wheels 230 and the rear idler wheels 240 are in high operating position. Such configuration could be advantageous over rough terrains since the front and rear angles of attack are greater, thereby allowing the track system 200 to more easily overcome obstacle, and the contact patch is smaller, thereby improving traction.

Figure 14A:
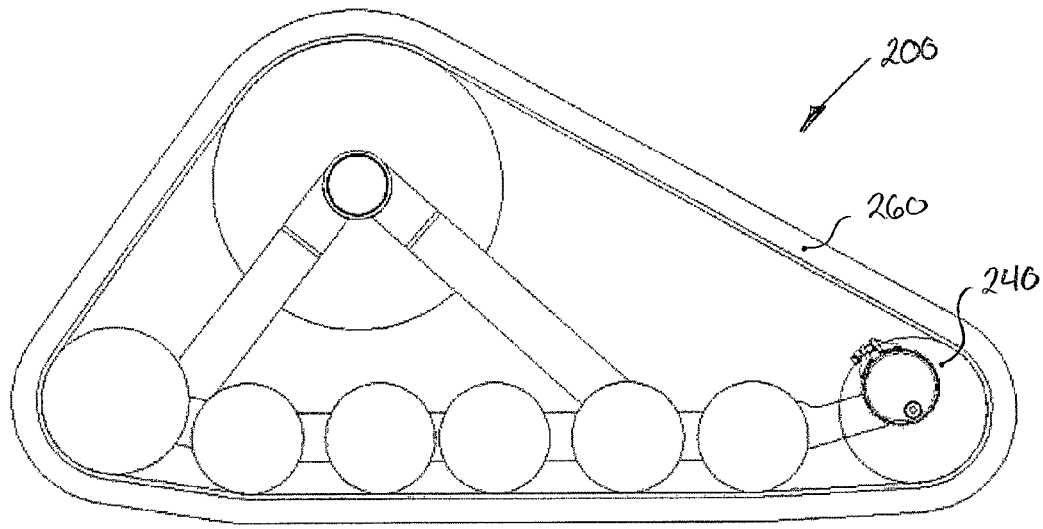
FIGS. 14A and 14B are schematic side views of the track system of FIG. 1 showing the rear idler wheels in the first operating position (FIG. 14A) and in the second operating position (FIG. 14B).
Figure 14B:
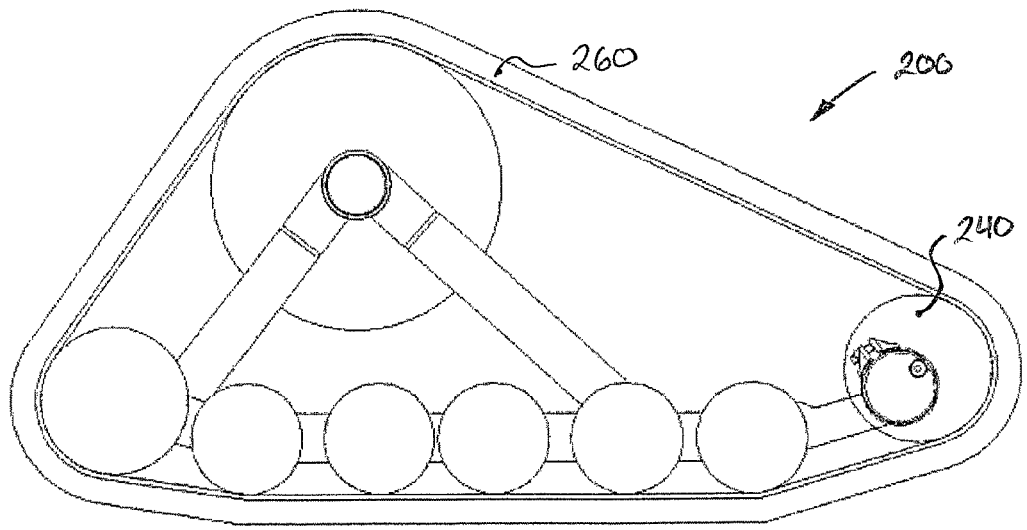

Similarly, FIGS. 14A and 14B respectively illustrate the track system 200 with the rear idler wheels 240 in low operating position and with the rear idler wheels 240 in high operating position. Again, by changing the operating position of the rear idler wheels 240, the operating configuration of the track system 200 can be changed to better suit terrain over which it is operated.

Figure 15A:
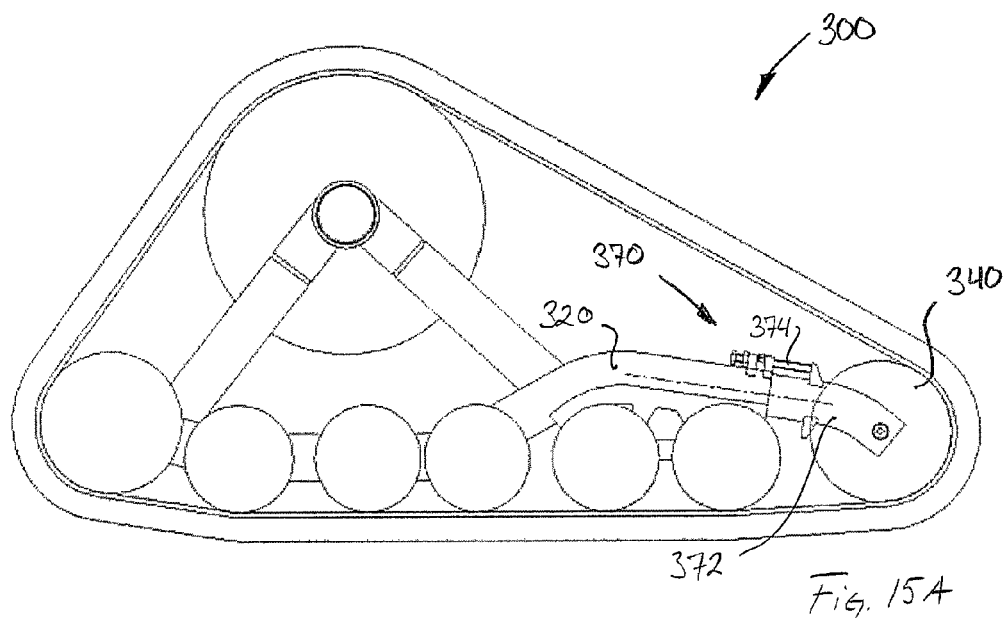
FIGS. 15A and 15B are schematic side views of another embodiment of a track system in accordance with the principles of the present invention showing the rear idler wheels in a first operating position (FIG. 15A) and in a second operating position (FIG. 15B).
Figure 15B:
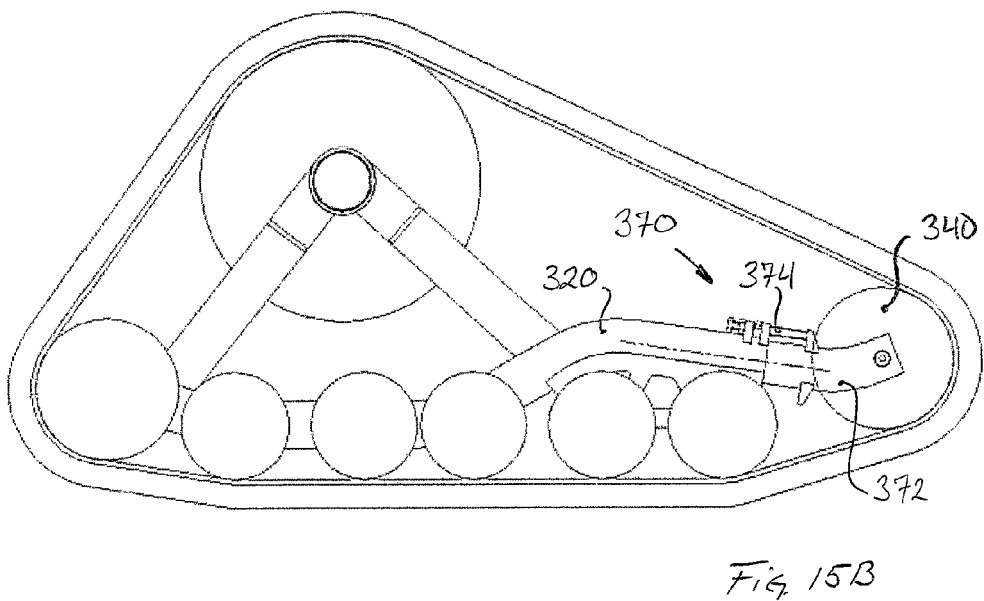

Referring now to FIGS. 15A and 15B, another embodiment of a track system 300 in accordance with the principles of the present invention is shown.

In track system 300, the adjustment mechanism 370 differs from the adjustment mechanism 170 but still allows the rear idler wheels 340 to be in a first (or low) operating position as shown in FIG. 15A, and in a second (or high) operating position as shown in FIG. 15B.

In track system 300, the adjustment mechanism 370 comprises an arcuate support member 372 which pivotally supports the rear idler wheels 340. The support member 372 is pivotally mounted to the support frame 320 such as to be rotatable downwardly or upwardly. Adjustment mechanism 370 further comprises a locking mechanism 374 (e.g. a lock bolt) for locking the support member 372 in its downward or upward operating position.

Figure 16A:
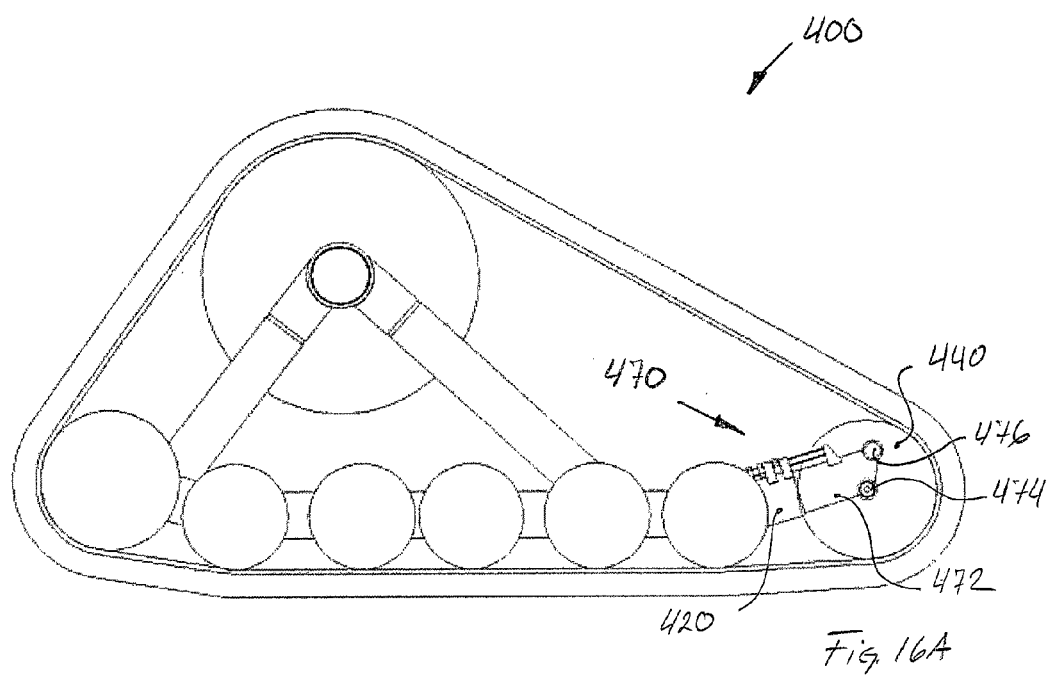
FIGS. 16A and 16B are schematic side views of another embodiment of a track system in accordance with the principles of the present invention showing the rear idler wheels in a first operating position (FIG. 16A) and in a second operating position (FIG. 16B).
Figure 16B:
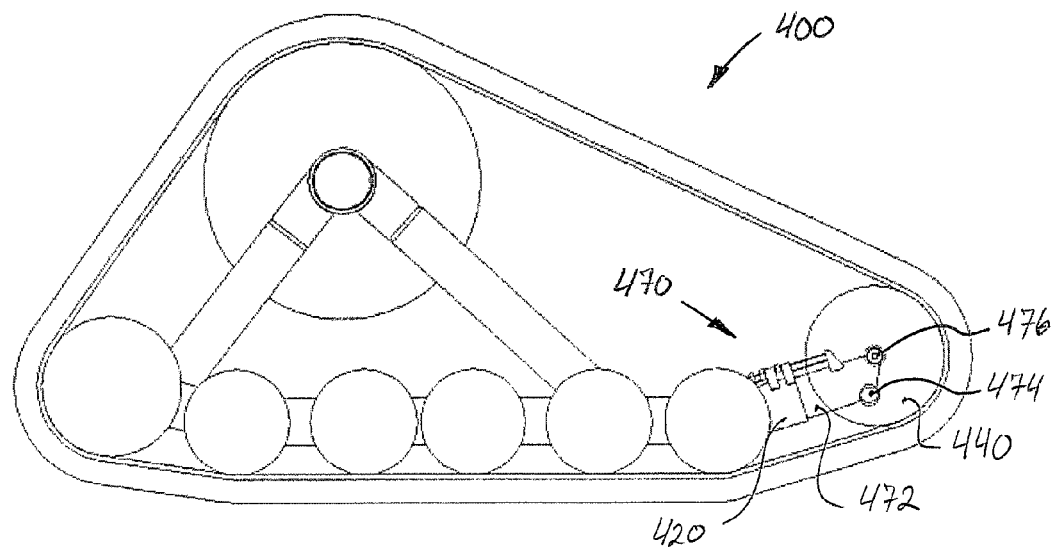

Referring now to FIGS. 16A and 16B, another embodiment of a track system 400 in accordance with the principles of the present invention is shown.

In track system 400, the adjustment mechanism 470 differs from adjustment mechanisms 170 and 370 but still allows the rear idler wheels 440 to be in a first (or low) operating position as shown in FIG. 16A, and in a second (or high) operating position as shown in FIG. 16B.

Adjustment mechanism 470 comprises an elongated support member 472 which is terminated by two different pivotal supports or shafts 474 and 476 for the rear idler wheels 440. The support member 472 is slidingly mounted to the support frame 420 for tension adjustment. By mounting the rear idler wheels 440 to either the first pivotal support 474 or to the second pivotal support 476, the rear idler wheels 440 can be in a first (or low) operating position as shown in FIG. 16A, and in a second (or high) operating position as shown in FIG. 16B.

Understandably, various adjustment mechanisms can be used to allow the front idler wheels and/or the rear idler wheels to be in different operating positions. In addition, though the adjustment mechanisms 370 and 470 typically allow only two different operating positions, other adjustment mechanisms such as adjustment mechanism 170 could allow more than two operating positions to allow the track system to be better suited to operate over various types of terrains.

Referring now to FIG. 17, an overlaid comparison between the overall shape of the perimeters of a front track system 500 when the adjustment mechanism 170 is in low operating position (solid lines) and when the adjustment mechanism 170 is in high operating position (dashed lines) is shown. The overlaid comparison clearly shows the change in the angle of attack and in the size of the contact patch when the position of both the front idler wheels 530 and the rear idler wheels 540 are changed.

Referring now to FIG. 18, the front track system 500 and the rear track system 200 are shown mounted to a vehicle 600 (e.g. a UTV) with overlaid comparisons of the overall shape of the perimeters when the idler wheels are in low operating position (solid lines) and in high operating position (dashed lines). Understandably, when the vehicle 600 is equipped with front and rear track systems have adjustable idler wheels, the idler wheels of both the front and the rear track systems can each be adjusted to better suit the terrain over which the vehicle is to be operated.

Understandably, by being able to selectively change the overall shape of the perimeter of a track system between different operating positions, a track system in accordance with the principles of the present invention can be properly adjusted to be used in different operating conditions while avoiding the need for an operator to have different sets of track systems.

While illustrative and presently preferred embodiments of the invention have been described in detail hereinabove, it is to be understood that the inventive concepts may be otherwise variously embodied and employed and that the appended claims are intended to be construed to include such variations except insofar as limited by the prior art.

The invention claimed is:

1. A track system for a vehicle, the track system comprising:
   a) a drive wheel configured to be mounted to the vehicle;
   b) a support frame;
   c) front idler wheels pivotally mounted to the support frame;
   d) rear idler wheels pivotally mounted to the support frame;
   e) road wheels pivotally mounted to the support frame;
   f) an endless track disposed about the drive wheel, the front and rear idler wheels, and the road wheels, the endless track defining an overall perimeter of the track system;
   wherein the support frame comprises at least two adjustment mechanisms, one of the adjustment mechanisms pivotally supporting the front idler wheels and the other of the adjustment mechanisms pivotally supporting the rear idler wheels, each of the at least two adjustment mechanisms being configured to allow the one of the front and rear idler wheels to be in at least two different operating positions, each of the operating positions corresponding to a different shape of the overall perimeter of the track system, the adjustment mechanism being adapted to substantially maintain the one of the front and rear idler wheels in one of the operating positions.

2. A track system as claimed in claim 1, wherein the support frame is pivotally mounted to the drive wheel.

3. A track system as claimed in claim 1, wherein the at least one adjustment mechanism is rotatably mounted to the support frame.

4. A track system as claimed in claim 1, wherein the at least one adjustment mechanism is slidingly mounted to the support frame.

5. A track system as claimed in claim 1, wherein the at least one adjustment mechanism comprises at least two locations where the one of the front and rear idler wheels can be pivotally mounted.

6. A track system as claimed in claim 1, wherein the at least one adjustment mechanism pivotally supports the front idler wheels.

7. A track system as claimed in claim 1, wherein the at least one adjustment mechanism pivotally supports the rear idler wheels.

8. A track system as claimed in claim 1, wherein the at least two different operating positions comprise a low operating position and a high operating position.

9. A track system as claimed in claim 1, wherein the at least two different operating positions comprise a low operating position and a high operating position.

10. A vehicle having mounted thereto at least one track system as claimed in claim 1.

11. A track system for a vehicle, the track system comprising:
   a) a drive wheel configured to be mounted to the vehicle;
   b) a support frame;
   c) front idler wheels pivotally mounted to the support frame;
   d) rear idler wheels pivotally mounted to the support frame;
   e) road wheels pivotally mounted to the support frame;
   f) an endless track disposed about the drive wheel, the front and rear idler wheels, and the road wheels, the endless track defining an overall perimeter of the track system;
   wherein the support frame comprises a first adjustment mechanism to which the front idler wheels are pivotally mounted, the first adjustment mechanism allowing the front idler wheels to be in at least two different operating positions, and wherein the support frame comprises a second adjustment mechanism to which the rear idler wheels are pivotally mounted, the second adjustment mechanism allowing the rear idler wheels to be in at least two different operating positions, whereby each of the operating positions corresponds to a different shape of the overall perimeter of the track system, the first adjustment mechanism being adapted to substantially maintain the front idler wheel in one of the operating positions and the second adjustment mechanism being adapted to substantially maintain the rear idler wheel in one of the operating positions.

12. A track system as claimed in claim 11, wherein the support frame is pivotally mounted to the drive wheel.

13. A track system as claimed in claim 11, wherein the at least two different operating positions comprise a low operating position and a high operating position.

14. A track system as claimed in claim 11, wherein at least one of the first and second adjustment mechanisms is rotatably mounted to the support frame.

15. A track system as claimed in claim 11, wherein at least one of the first and second adjustment mechanisms is slidingly mounted to the support frame.

16. A track system as claimed in claim 11, wherein at least one of the first and second adjustment mechanisms comprises at least two locations where the front or idler wheels can be pivotally mounted.

17. A vehicle having mounted thereto at least one track system as claimed in claim 11.

\* \* \* \* \*